United States Patent
Suh et al.

(10) Patent No.: US 7,733,556 B2
(45) Date of Patent: Jun. 8, 2010

(54) OPTICAL DEVICES WITH CASCADED LIQUID CRYSTAL ELEMENTS

(75) Inventors: SeongWoo Suh, Mount Olive, NJ (US); Yossi Corem, Beit Shemesh (IL)

(73) Assignee: Oclaro (New Jersey), Inc., Denville, NJ (US)

( * ) Notice: Subject to any disclaimer, the term of this patent is extended or adjusted under 35 U.S.C. 154(b) by 763 days.

(21) Appl. No.: 10/556,307

(22) PCT Filed: May 9, 2004

(86) PCT No.: PCT/IL2004/000389

§ 371 (c)(1),
(2), (4) Date: Nov. 9, 2006

(87) PCT Pub. No.: WO2004/099822

PCT Pub. Date: Nov. 18, 2004

(65) Prior Publication Data

US 2007/0183019 A1     Aug. 9, 2007

Related U.S. Application Data

(60) Provisional application No. 60/500,231, filed on Sep. 5, 2003.

(51) Int. Cl.
*G02F 1/01* (2006.01)
(52) U.S. Cl. .................. 359/279; 359/245; 359/238
(58) Field of Classification Search ............. 359/238, 359/239, 279, 245
See application file for complete search history.

(56) References Cited

U.S. PATENT DOCUMENTS

| 5,126,868 A | 6/1992 | Kizaki et al. |
| 5,245,451 A | 9/1993 | Wu et al. |

(Continued)

FOREIGN PATENT DOCUMENTS

| EP | 0 238 248 A2 | 9/1987 |

(Continued)

OTHER PUBLICATIONS

International Search Report mailed on Mar. 28, 2005, for International Patent Application No. PCT/IL04/00389, filed on May 9, 2004. 2 pages.

(Continued)

*Primary Examiner*—Timothy J Thompson
(74) *Attorney, Agent, or Firm*—Morrison & Foerster LLP

(57) ABSTRACT

An optical beam processing device with two serially disposed birefringent elements, each element having its own direction of orientation. At least one element is pixelated with electrodes activated by control signals. The directions of orientation of the elements are aligned such that the phase shift imparted to the beam by an unactivated pixel of one element, cancels the phase shift imparted to the beam by the other element, such that the beam traversing that pixel undergoes zero phase shift. An appropriate control signal adds a phase shift to the beam passing through that pixel, so as to generate an overall phase shift through the device for any desired wavelength, which could not be readily achieved by either of the elements alone. The resulting device is thus able to provide switchable phase shifts of exactly zero and pi, for different wavelengths, generally unattainable by a single element device.

7 Claims, 6 Drawing Sheets

U.S. PATENT DOCUMENTS

| | | | |
|---|---|---|---|
| 5,714,970 A | 2/1998 | Bos et al. | |
| 6,567,437 B1 * | 5/2003 | Imaki et al. | 372/32 |
| 7,301,974 B2 * | 11/2007 | Imaki et al. | 372/32 |

FOREIGN PATENT DOCUMENTS

| | | |
|---|---|---|
| EP | 0238248 | 9/1987 |
| GB | 2-201-256 A | 12/1987 |
| WO | WO-00/46631 | 8/2000 |
| WO | WO 00/46631 A1 | 8/2000 |
| WO | WO-02/071133 | 9/2002 |
| WO | WO 02/071133 A2 | 9/2002 |
| WO | WO 02/071660 A2 | 9/2002 |
| WO | WO-03/009054 | 1/2003 |
| WO | WO 03/009054 A2 | 1/2003 |
| WO | WO 03/032071 A1 | 4/2003 |

OTHER PUBLICATIONS

Supplementary European Search Report mailed on Feb. 15, 2007, for Europeans Patent Application No. 04 73 1845. 2 pages.

EP Examination Report mailed Jun. 29, 2009, directed to EP Patent Application No. 04731845.6; 4 pages.

\* cited by examiner $v = 0$ $v = v_1(\lambda_1)$
$= v_2(\lambda_2)$

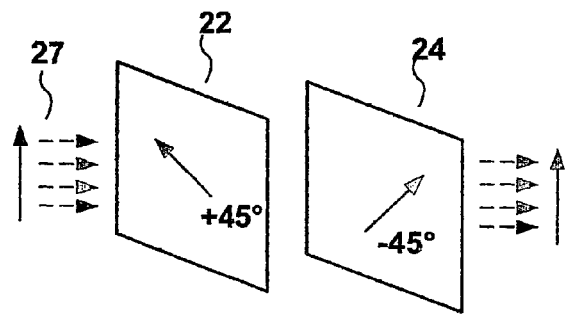
Fig. 4C
Fig. 5    (Prior Art)
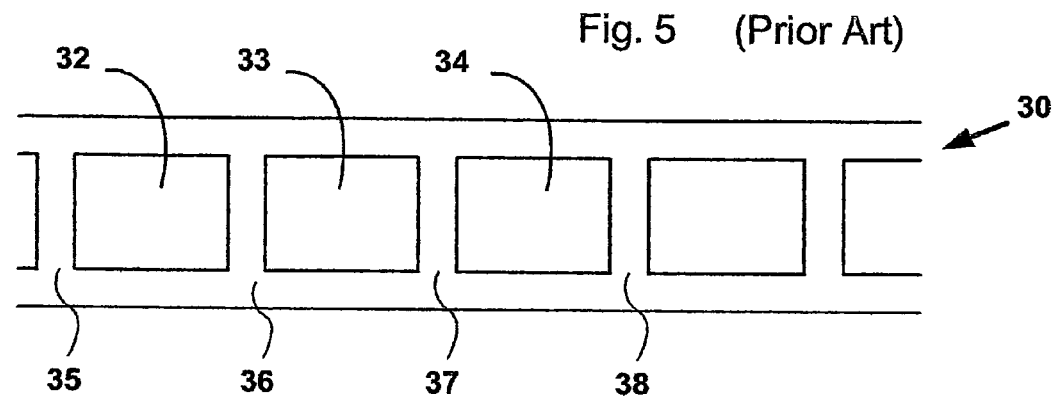
Fig. 6    (Prior Art)
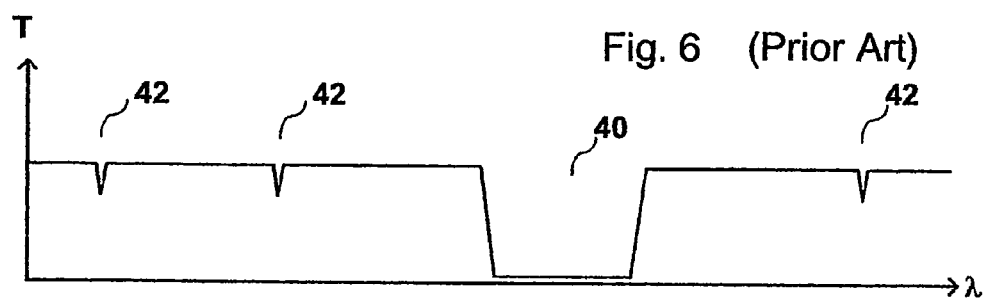
Fig. 7
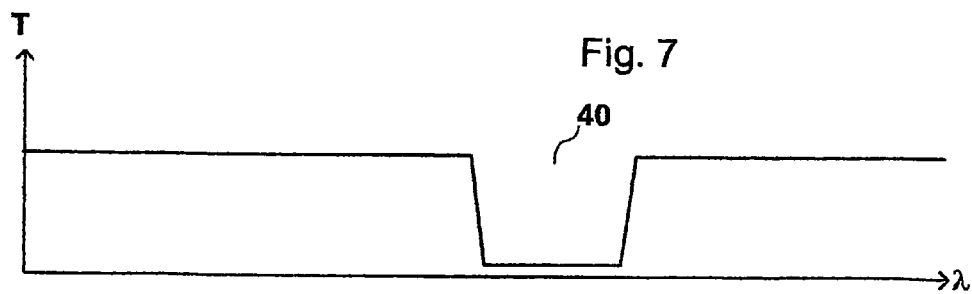

Fig. 8
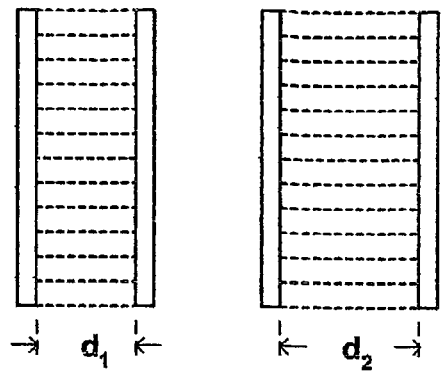
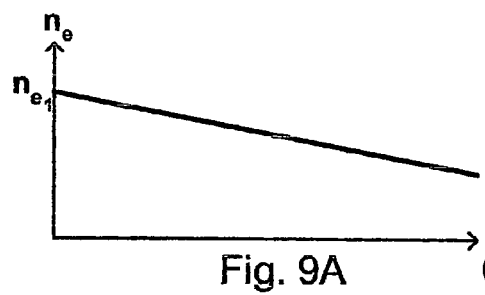
Fig. 9A
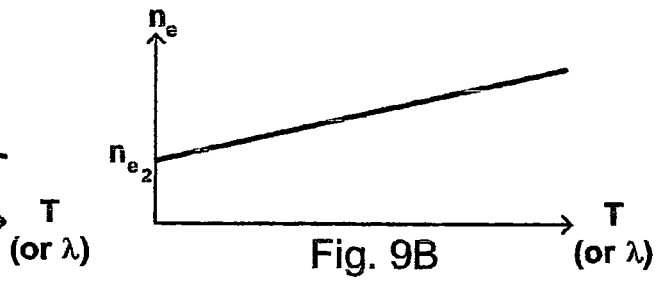
Fig. 9B
Fig. 9C
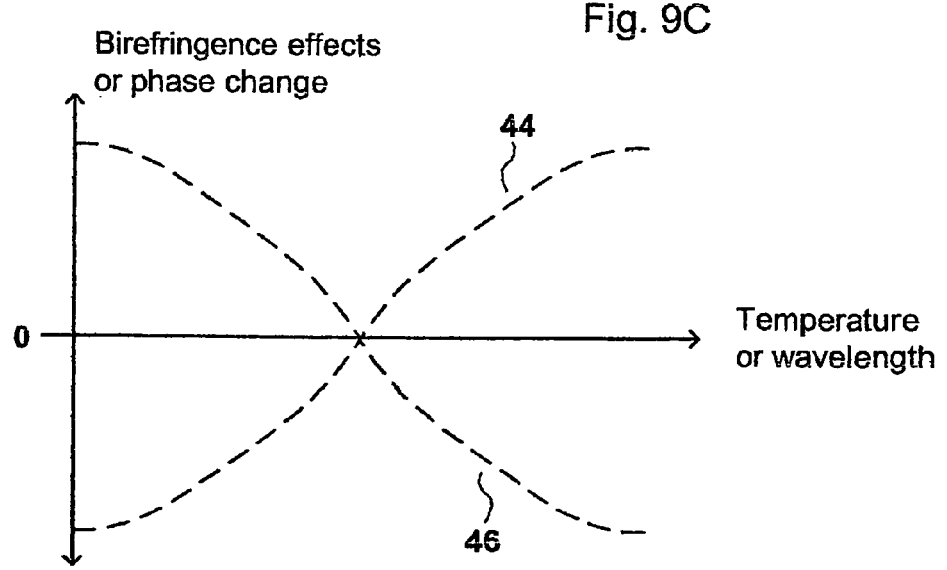

US 7,733,556 B2

OPTICAL DEVICES WITH CASCADED LIQUID CRYSTAL ELEMENTS

REFERENCE TO RELATED APPLICATION

This application is a national stage of PCT/IL2004/000389 which was published on Nov. 18, 2004 and which claims the benefit of priority to U.S. Application No. 60/500,231 filed May 9, 2003.

FIELD OF THE INVENTION

The present invention relates to the field of optical devices utilizing the properties of serially cascaded phase shifting or polarization rotation elements, such as liquid crystal elements, especially for use as signal processing, switching or routing devices in optical communication applications.

BACKGROUND OF THE INVENTION

Many devices for use in optical communication networks utilize electrically controllable, birefringent elements, generally liquid crystal (LC) elements for performing signal modulation functions, generally by means of changing the phase between the ordinary and the extraordinary components of the optical beam transmitted through the element, and hence the polarization direction of the beam. These applications are generally achieved using a single liquid crystal element for each optical function to be accomplished. In the prior art there are described numerous examples of such applications, including for instance, those described in PCT Application. No. PCT/IL/02/00511 for Wavelength Selective Optical Switch, and in PCT Application No. PCT/IL/02/00188 for Fiber Optical Attenuator, published as WIPO document WO 02071133, and in PCT Application No. PCT/IL/02/00187 for Dynamic Gain Equalizer, published as WIPO document WO 02071660, and in PCT Application No. PCT/IL/02/00167 for Fiber Optical Gain Equalizer, published as WIPO document WO 03009054, all of which are incorporated herein by reference, each in its entirety.

Systems which use multiple liquid crystal elements have also been described in the prior art, such as that described in the article entitled "Programmable phase and amplitude femtosecond pulse shaping" by M. W. Wefers and K. A. Nelson, published in Optics Letters, Vol. 18, No. 23, pp. 2032-2034, 1993. In this application, although two LC elements are used serially as spatial light modulators in a pulse shaping application, each would appear to fulfil a different system function. Thus, one is used as a phase mask, modulating the relative phases of the different dispersed frequency components of the beam, while the other acts as an amplitude mask, which attenuates the different frequency components of the beam.

In prior art applications and systems using liquid crystal (LC) elements, each optical signal modulation or processing function is generally fulfilled by a single LC element, and each system module may include a number of such functions. However, this generally results in limitations on the desired functionality because of intrinsic limitations of each liquid crystal element. Such limitations can arise from a number of possible sources. Thus, for instance, there may be limitations in the overall phase shift which can be generated in the LC element, because of the nature of the behavior of birefringence as a function of applied voltage. Additionally, there may be limitations to the temperature stability of the device because of the temperature coefficient of the birefringence in the liquid crystal material. When temperature stability is important, prior art applications often utilize temperature stabilization of the entire circuit module using internal heaters, which complicates and increases the cost of the circuit module. Furthermore, most liquid crystal materials have wavelength-dependent operation, since such materials are generally dispersive. The efficiency of the circuit function in which they are used is thus wavelength dependent, and in, for instance, a prior art liquid crystal based channel blocking module, the attenuation at the center of the waveband may be higher than that at the band edges since the phase change or polarization rotation generated in the LC material cannot generally be optimized for all wavelengths. Adjustment of the switching voltage in such devices for each separate wavelength-dispersed pixel is not generally a simple or cost-effective solution.

Furthermore, since each different type of LC material—whether nematic, twisted nematic, smectic, chiral nematic, or any other type—has its own functional limitations, and the way in which the material is operable in the LC element may also be functionally limited, the available range of suitable LC materials may not enable attainment of the exact optical functionality desired. Furthermore, the alignment of the optical axis of the LC element, as defined by the rubbing direction, also generally limits the available use configuration of the element. Additionally, there may be spatial limitations to the pixel patterns useable on prior art single LC devices, and this may limit their applicability for some system requirements.

There therefore exists a need for liquid crystal devices which can operate without the limitations of the kinds mentioned hereinabove, or at least with reduced limitations, in order to enable the construction of more specifically suited devices for use in dedicated optical processing systems.

The disclosures of each of the publications mentioned in this section and in other sections of the specification, are hereby incorporated by reference, each in its entirety.

SUMMARY OF THE INVENTION

The present invention seeks to provide a new birefringent optical beam processing device, which overcomes the limitations and disadvantages of prior art single element optical beam processing devices, by the serial combination of two or more single birefringent elements, to perform the circuit functionality of a single element device. The properties of each of the elements are chosen preferably such that the limitations in the functionality of one element are compensated for by the combined effect of the interaction of the second element with the transmitted light, with that of the first element. The device of the present invention is distinguished from prior art applications using more than one birefringent device in that in the present invention, each of the component elements preferably fulfills the same general optical functionality as that of the combined device, and the resultant functionality is a result of the cumulative effect of the functionality of each component part. Though the present invention is applicable for use in devices using birefringent elements in general, the elements most often currently used in such devices are, in all probability, liquid crystal elements, and the various preferred embodiments of the present invention are thus generally described in terms of such liquid crystal elements. However, it is to be understood that the present invention is not meant to be limited to liquid crystal elements, but is applicable to the use of any suitable birefringent elements.

In many of the preferred embodiments of the present invention, the optical functionality which is performed by each of the elements is the generation of a phase difference between the ordinary and the extraordinary components of light transmitted therethrough, by means of the birefringence of the material in each of the elements. When the material is in its unswitched state, the optical properties such as phase change or birefringence of the first element is preferably compensated for by the optical properties of the other element or elements in the device. In a similar manner, the dependence on temperature or on the wavelength of the transmitted light, of the overall phase shift which can be generated in one of the elements, because of the dependence of the birefringence itself on temperature or wavelength, can also be preferably compensated by the other element or elements of the device. At least one of the elements of the device is generally pixelated, such that the device can perform its desired spatially selective optical processing function. In general, the other element or elements of the device do not need to be pixelated, as they generally perform compensating functions only. The compensation effect of the second element can arise from the dimensions, material type, material properties, optical axis alignment direction, or other property or disposition of the second element, as further described hereinbelow.

A particularly useful embodiment of the above-described type of device is an optical beam processing device, made up of two birefringent elements serially disposed in the beam, each element having its own direction of orientation. Either or both of the birefringent elements have pixels with electrodes for activation by means of an applied control signal. The directions of orientation of the elements are mutually aligned such that, without an applied control signal, a phase shift imparted to the beam by a pixel of one birefringent element, exactly cancels the phase shift imparted to the beam by the other birefringent element, such that the beam traversing that pixel undergoes essentially zero phase shift. When the appropriate control signal is applied to the pixel, a phase shift is added to the beam passing through that pixel, so as to generate an overall phase shift to the beam traversing the device, which could not generally be readily achieved by either of the birefringent elements alone. If that phase shift is arranged to be exactly π, the described double element device is able to provide switchable phase shifts of exactly zero and π, which would be unattainable by a single element device, because of limitations of the birefringent material, as described herein. In general, such concomitant phase shifts are not readily attainable in a single element device and with reasonable applied control voltages, because of an inability of an applied control signal of practical magnitude to equalize the ordinary and extraordinary refractive indices of the active material of the pixel of the birefringent element The implications of the use of such a double-element device in a switching application are that an improved ratio of maximum attenuation to minimum insertion loss is obtainable, compared to that of a single element switch.

There is thus provided in accordance with a preferred embodiment of the present invention, a an optical beam processing device comprising (i) a first birefringent element disposed in the beam, having a first preferred direction of orientation, and (ii) at least a second birefringent element disposed in the beam serially to the first birefringent element, and having a second preferred direction of orientation, wherein at least one of the birefringent elements has pixels, the pixels having electrodes for activation by means of an applied control signal, and wherein the preferred directions of orientation of the first and the at least second elements are mutually aligned such that the phase shift imparted to the optical beam by a pixel of the at least one birefringent element, without an applied control signal, cancels the phase shift imparted to the optical beam by the other birefringent element, such that that part of the optical beam traversing the first and the at least a second birefringent element through the pixel, undergoes essentially zero phase shift.

In the above described device, application of a predetermined control signal to a pixel electrode of the at least one birefringent element, is preferably operative to impart a phase shift to the optical beam traversing the pixel, which when added to the phase shift imparted by the other birefringent element to the optical beam traversing the pixel, provides a desired total phase shift. The birefringent elements are generally such that the desired total phase shift would be unattainable by either of the first and the at least second birefringent elements alone. In particular, the desired total phase shift may in common applications, be an essentially π phase shift, which would generally be unattainable because of an inability of the control signal to equalize the ordinary and extraordinary refractive indices of the active material of the pixel of the birefringent element. In such optical devices, according to these preferred embodiments of the present invention, a phase shift adjustable from zero phase shift to π phase shift, can be imparted to the optical beam traversing a pixel, according to the control signal applied to the pixel.

Furthermore, the optical beam processing device can preferably be an optical switch, and it can also preferably be wavelength selective. If operable as a switch, the device may be preferably such that the switch status is closed to transmission of light through the pixel when the predetermined control signal is applied to the pixel, or alternatively and preferably, open to transmission of light through the pixel when no control signal is applied to the pixel. In the case when the switch is open when no control signal is applied to the pixel, according to this preferred embodiment, the switch can provide essentially unperturbated transmission between neighboring pixels of the switch when both of the neighboring pixels are open to transmission.

According to further preferred embodiments of the present invention, in any of the above-described devices, the first preferred direction of orientation and the second preferred direction of orientation should preferably be essentially perpendicular. Additionally, in all of the above-described embodiments, the device can be aligned such that the beam first impinges on either the first or on the at least second birefringent. Preferably at least one of the first and the at least second birefringent elements are liquid crystal elements.

There is further provided according to yet another preferred embodiment of the present invention, an optical processing device comprising a first birefringent element, having a first preferred direction of orientation and imparting a first phase shift to light passing therethrough, and at least a second birefringent element disposed serially to the first element such that the light traverses both elements, the second element having a second preferred direction of orientation, at least the second element having at least one pixel activated by means of an applied control signal to impart a second controllable phase shift to the light traversing the at least one pixel, wherein the first and the at least second elements are mutually aligned such that to light traversing the device through the at least one pixel is imparted a first total phase shift when the at least one pixel is unactivated, and a second total phase shift when the at least one pixel is activated, the difference between the first total phase shift and the second total phase shift being attainable for any desired wavelength by selection of the control signal. In the above described device, the first and the at least second elements are preferably mutually aligned such that the first phase shift is equal and opposite to the second phase shift, such that the first total phase shift is zero, and the control signal is selected such that the second total phase shift is a π phase shift. Alternatively and preferably, the control signal is selected such that the second total phase shift is a π/2 phase shift. In accordance with another preferred embodiment of the present invention, the optical processing device can impart to the light traversing the at least one pixel, a phase shift adjustable from zero phase shift to π phase shift, according to the control signal applied to the at least one pixel. Alternatively and preferably, the phase shift is adjustable from zero phase shift to π/2 phase shift, according to the control signal applied to the at least one pixel.

There is further provided in accordance with still other preferred embodiments of the present invention, an optical processing device as described above and wherein the birefringent properties of the birefringent elements are wavelength dependent, and wherein the control signal applied to the at least one pixel is adjusted according to the wavelength of the light traversing the at least one pixel, such that the device is essentially wavelength independent.

Any of the above described optical processing devices can preferably be an optical switching element. Additionally, according to a further preferred embodiment, a second such switch element can be disposed adjacent to the first switch element, and both of the switch elements are preferably such as to be open to transmission of light when no control signal is applied thereto, such that the device provides essentially unperturbated transmission in the region between the first and the second switch elements when both switches are in an open state. Furthermore, the second such switch element can be part of an array of optical switch elements, at least two adjacent ones of the switch elements being such as to be open to transmission of light when no control signal is applied thereto, and wherein the array provides essentially unperturbated transmission between the two adjacent switch elements when both of the adjacent elements are open to transmission.

In accordance with yet another preferred embodiment of the present invention, in the above described optical devices, the first preferred direction of orientation and the second preferred direction of orientation are preferably essentially perpendicular. Furthermore, the light passing therethrough may generally be linearly polarized, and the first preferred direction of orientation and the second preferred direction of orientation are preferably aligned such that they are each at 45° to the polarization direction of the light.

In accordance with further preferred embodiments of the present invention, in the above described devices, the first and the at least second birefringent elements are disposed such that the light impinges first on either the first birefringent element or on the at least second birefringent element. Furthermore, in any of those embodiments, at least one of the first and the at least second birefringent elements is preferably a liquid crystal element.

There is further provided in accordance with yet another preferred embodiment of the present invention, an optical processing device comprising a first birefringent element having a first preferred direction of orientation and imparting a first phase shift to light passing therethough, the birefringence of the element having a functional variation with at least one of temperature and wavelength, and at least a second birefringent element disposed serially to the first element such that the light traverses both elements, the second element having a second preferred direction of orientation, to impart a second phase shift to the light, wherein the birefringence of the second element has a functional variation with at least one of temperature and wavelength different from that of the first element, and wherein the elements are mutually aligned such that the functional variation of the birefringence of the optical processing device is reduced in comparison with the functional variation of the birefringence of either one of the elements alone. The functional variation of the birefringence of at the first and the second birefringent elements may preferably be a variation of the difference between the ordinary and the extraordinary refractive indices of the birefringent material of the elements with at least one of temperature and wavelength. Additionally, the birefringence of the first and the second birefringent elements may also be a function of the optical thickness of the elements. In any of these preferred embodiments, at least one of the first and the at least second birefringent elements may be a liquid crystal element. Likewise, the first and the at least second birefringent elements may be disposed such that the light impinges first on either the first birefringent element or on the at least second birefringent element.

In accordance with still more preferred embodiments of the present invention, there is provided an optical processing device as described above, and wherein the second birefringent element has an array of pixels of birefringent elements activated by means of applied control signals, such that the device has a number of separate channels, the phase shift through any channel being selectable by means of the appropriate control signal. The separate channels preferably transmit different wavelengths of the light.

Alternatively and preferably, the first birefringent element also has an array of pixels of birefringent elements activated by means of applied control signals. In this case, the pixels of the array of the first birefringent element and the pixels of the array of the second birefringent element may be of essentially the same size and pitch or of different size and pitch. In cases where the aforesaid pixels are of essentially the same size and pitch, the pixels of the array of the first birefringent element and the pixels of the array of the second birefringent element may be aligned linearly with each other, such that light passing through the center of a pixel of the array of the first birefringent element also passes through the center of a pixel of the array of the second birefringent element, or they may be aligned in a laterally offset manner from each other, such that light passing through the center of a pixel of the array of the first birefringent element passes essentially through the region between two pixels of the array of the second birefringent element.

In cases where the aforesaid pixels are of different size and pitch, the pixels of the array of the first birefringent element and the pixels of the array of the second birefringent element may be aligned in a manner relative to each other, such that the light passing through the region between two pixels of the array having the larger pixel size and pitch also passes through the region between two pixels of the array having the smaller pixel size and pitch. Alternatively and preferably, they may be aligned in a laterally offset manner from each other, such that the light passing through the region between two pixels of the array of the first birefringent element does not pass through the region between two pixels of the array of the second birefringent element.

BRIEF DESCRIPTION OF THE DRAWINGS

The present invention will be understood and appreciated more fully from the following detailed description, taken in conjunction with the drawings in which:

FIG. 2A is a schematic graph of the ordinary and the extraordinary refractive indices of a typical liquid crystal material as a function of the voltage applied across the material; FIGS. 2B and 2C are equatorial plane cross-sections of a Poincaré sphere diagram showing the state of polarization of light traversing the prior art device of FIG. 1, for no applied drive voltage and for an applied drive voltage respectively;

FIGS. 4A to 4C schematically illustrate the polarization behavior of the embodiment shown in FIG. 3; FIGS. 4A and 4B are equatorial plane cross-sections of a Poincaré sphere diagram showing the state of polarization of light traversing the device according to the preferred embodiment of FIG. 3, for no applied drive voltage and for an applied drive voltage respectively, and FIG. 4C is a schematic illustration of the polarization axis direction alignment of the device according to the preferred embodiment of FIG. 3;

FIG. 5 is a schematic illustration of an array of pixels on a prior art, single cell, liquid crystal beam polarization modulator;

FIG. 6 is a schematic graph of the transmission function at the focal plane of a device using the array of FIG. 5 as the polarization modulating element;

FIG. 7 is a schematic graph of the transmission function of light passing through a device constructed according to a preferred embodiment of the present invention, using the liquid crystal element of FIG. 3;

FIG. 8 is a schematic illustration of a device according to another preferred embodiment of the present invention, in which the liquid crystal cells have different thicknesses, $d_1$ and $d_2$;

FIGS. 9A and 9B are schematic graphs illustrating plots of the effect of changes in temperature or of transmitted wavelength on the value of $n_e$ for typical liquid crystal materials used in the two elements of a device according to the present invention, for the purposes of canceling the temperature or wavelength dependence of $n_e$; FIG. 9C is a schematic representation of the compensation for changes in the birefringence and the generated phase change in the liquid crystal material, as a function of the effect of ambient temperature or wavelength of the transmitted light, by serial use of two liquid crystal cells.

DETAILED DESCRIPTION OF PREFERRED EMBODIMENTS

Figure 1:
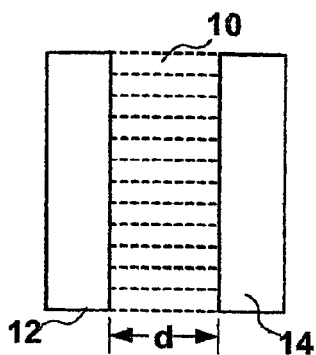
FIG. 1 is a schematic drawing of a liquid crystal element, used as a polarization modulator or rotator in a prior art optical signal processing device.

Reference is now made to FIG. 1, which illustrates schematically a birefringent control element, in this example, a liquid crystal element, as conventionally used as a polarization modulator or rotator in prior art optical signal processing, switching or routing devices. The element generally comprises a liquid crystal material 10 of thickness d, known as the cell gap, sandwiched between two outer transparent plates 12, 14, preferably constructed of thin glass plates, and onto which are generally deposited the optically transparent control electrodes for applying the voltages necessary to switch the liquid crystal element. One of the electrodes is generally pixelated in order to spatially process the different parts of the beam passing through the element, as required by the application. A phase shift, $\Delta\phi$, is generated between the ordinary and extraordinary components of light passing through the element, because of the difference in the refractive indices of the ordinary and the extraordinary axes of the crystal. This phase shift is given by the expression:

$$\Delta\phi = \Delta n \cdot d \cdot 2\pi/\lambda \tag{1}$$

where:

$\lambda$ is the wavelength of the light passing through the pixel, and $\Delta n = (n_o - n_e)$, is the difference between the ordinary and the extraordinary refractive indices of the liquid crystal material, arising from the birefringence of the material. The difference $\Delta n$ can be positive or negative, depending on the type of liquid crystal material used. For a negative nematic LCD, $n_o > n_e$, for a positive nematic LCD, $n_e > n_o$. In general, the explanations of the following preferred embodiments of this application are described in terms of a negative nematic liquid crystal device, in which $n_o > n_e$, though it is to be understood that the various embodiments are also operable for birefringence of the opposite sign, which is generally even the more commonly used case.

In normal use of such an element, the phase shift through any pixel of the liquid crystal element can be changed by varying the applied drive voltage across that pixel, which is operative to change the value of $n_e$ as a function of the applied voltage. When used in a typical signal processing, switching or routing application, in order to ensure that the system has respectively maximum transmission and maximum attenuation for the two states of the element, activated and non-activated, it is generally necessary to ensure that the phase shift $\Delta\phi$ in the light passing through the pixel be as close as possible to exactly 0 or $\pi$ respectively. Any phase change of less than the full range of $\pi$ would result in a reduced attenuation level in the optically closed state, when applied for instance, in a switching or blocking application using polarization directions to control the transmission properties.

Such a 90° polarization rotation is obtained by ensuring that the mutual phase shifts of the ordinary and the extraordinary beams are as close as possible to $2n\pi$ and/or $m\pi$, where n and m are integers, only one of which can be zero, for the two respective switched states of the element, and the degree to which these values of phase shift are achieved determines the overall quality of the device's optical performance.

Figure 2A:
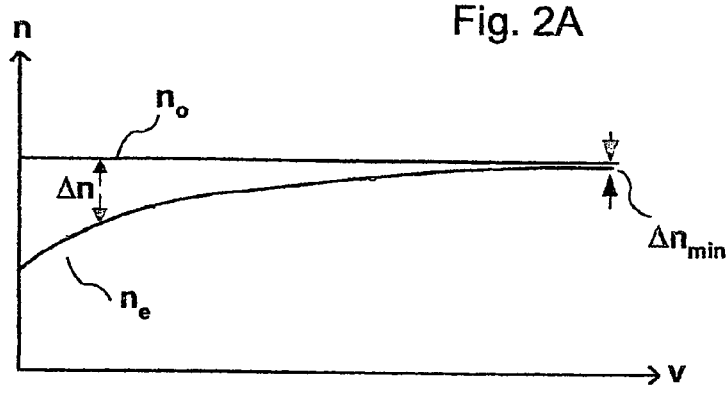
FIGS. 2A to 2C are graphical examples illustrating some of the properties of liquid crystal materials that limit the performance of devices constructed therewith.

Reference is now made to FIG. 2A, which illustrates a physical explanation for one of the inabilities to realize perfect performance in the above-mentioned LC elements. FIG. 2A is a schematic graph of variation of the ordinary and the extraordinary refractive indices as a function of the voltage applied across the material, in a typical homogeneously aligned LC material of thickness that provides $\pi$(or close to $\pi$) phase shift with no applied voltage. The graph shows that even at high applied voltages, the extraordinary index $n_e$ does not quite reach the value of the ordinary index $n_o$, such that the value of $\Delta n$ never generally gets completely to zero, but is limited, using the maximum acceptable applied voltage to a value of $\Delta n_{min}$. This is mainly due to a surface boundary layer, which is hard to move, even at high applied voltages. Thus, even though the thickness of the cell gap has been chosen to provide exactly $\pi$ phase shift when the zero voltage state is selected, at the maximum rated applied voltage, the phase shift does not generally fall completely to zero, which it would if $n_e$ were to reach the value of $n_o$, but has some small residual value, and true zero phase shift cannot thus be achieved. For lower drive voltages, the problem is even more critical. As a result, the element does not behave ideally, and prior art devices built using such elements therefore suffer from reduced optical performance, either in the form of increased insertion loss, or more specifically, in the form of reduced maximum attenuation.

Increase of the applied voltage so much that the value of $\Delta n$ for the chosen material were to fall completely to zero, is not an advisable mode of operation, since it is inconvenient and life-limiting to operate the devices at such high drive voltages, and is more costly to supply drive units for such voltages. Attempts to obtain 0 and $\pi$ phase shifts for the two states of the element by increasing the drive voltage, is thus generally an impractical solution, even where the chosen material would allow it.

As an alternative, it is possible to obtain phase shifts of exactly $2n\pi$ and or $m\pi$, where n and m are integers, only one of which can be zero by using a larger thickness cell gap, d, and by preferably arranging the element such that with zero applied voltage, the phase change is slightly more than $2\pi$, for example $2.1\pi$, while at the rated applied voltage, the phase change reaches slightly more than $\pi$, for example $1.1\pi$. Thus, even though the applied voltage is incapable of equalizing $n_e$ and $n_o$, the mutual phase shift between the two states can be made to be truly $\pi$. However, this solution has the disadvantage that in order to define the desired phase shift, two actively driven states are required, since both the proposed $2.1\pi$ and the $1.1\pi$ phase shifts are obtained under drive voltages. It is theoretically possible to produce an element which has a thickness such that a phase change of exactly $2.1\pi$ is generated in passage through it without any applied voltage, such that only one active state is required. However, the production of a cell with a thickness so accurate as to provide an exact phase shift without electrical control, is not trivial, making this solution generally impractical.

However, in addition to the above-mentioned disadvantages, this approach suffers from a number of additional operative disadvantages, which makes it commercially unattractive. Firstly, the use of a thicker cell mandates the use of higher drive voltages, with the concomitant disadvantages, as mentioned above. Secondly, such a thicker cell has a slower response time and higher dispersion. This affects the cell performance and reduces the blocking capability of a device produced using such a cell. Finally, the manufacture of elements with thicker cell gaps is more complex and has a lower yield, and such elements cannot generally be optimized to provide the results attainable with thinner elements. For these reasons, the use of a thicker cell gap is also generally not recommended.

Some of the limitations and disadvantages of the behavior of such prior art liquid crystal elements is illustrated by reference to FIGS. 2B and 2C, which are equatorial plane cross-sections of a Poincaré sphere diagram showing the state of polarization of light traversing the prior art device of FIG. 1, in FIG. 2B for no applied drive voltage and in FIG. 2C for an applied switching drive voltage. In the equatorial plane shown, the light traversing the device is of linear polarization.

Figure 2B:
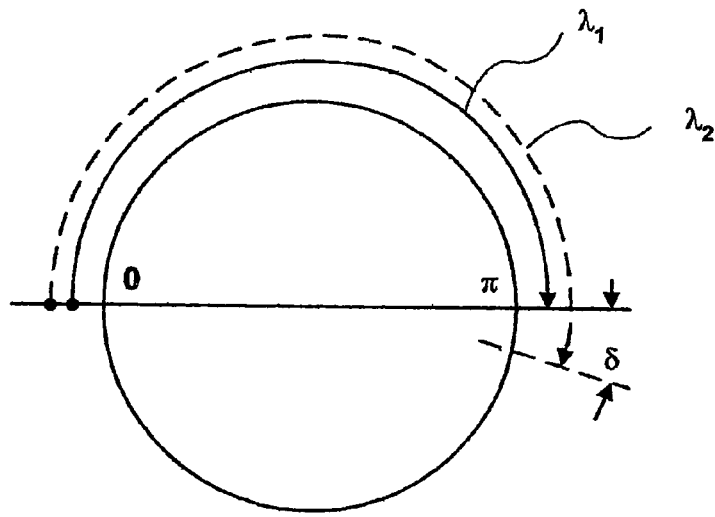

In FIG. 2B, it is observed that the differential phase shift $\phi_1$ of the light traversing the liquid crystal without any applied voltage is such as to move the Stokes vector from the point 0 exactly to the point $\pi$, such as is described in the examples given in "Polarized Light in Optics and Spectroscopy", by D. S. Kliger, J. W. Lewis and C. E. Randal, Chapters 4 and 5, Academic Press, 1997. This is shown for a first wavelength $\lambda_1$ by the full line in FIG. 2B. When now the switching voltage V is applied to the LC element, reference to FIG. 2C shows that for the wavelength $\lambda_1$, the phase shift vector is not returned exactly to 0, but falls short by the small angle $\epsilon_1$, since $n_e$ falls short of the value of $n_o$ at the applied voltage, for the material-related reasons explained above in connection with FIG. 2A. Therefore, the two states of this prior art element are not switchable by a full $\pi$, as optimally required.

Figure 2C:
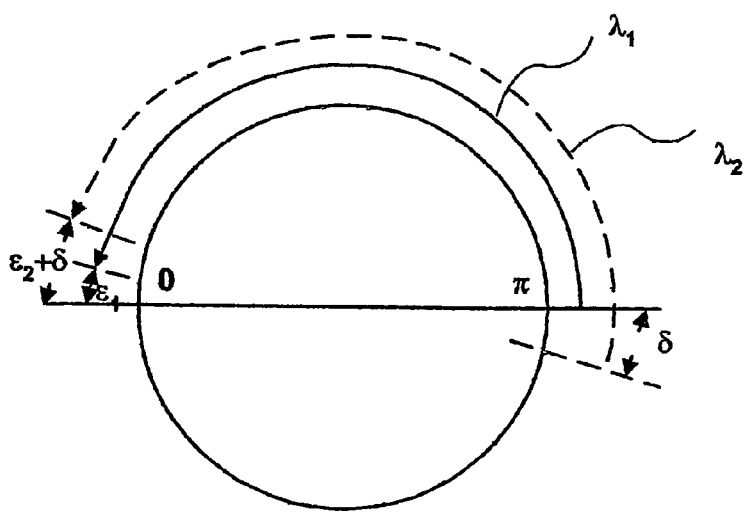

Furthermore, for a second wavelength $\lambda_2$, as shown by the dotted lines of FIGS. 2B and 2C, because of longer wavelength of input light and/or the dispersive properties of the LC material, the phase shift vector may typically be extended by an additional small angle $\delta$, such that light of wavelength $\lambda_2$ is a priori phase shifted differently, as shown in FIG. 2B. On application of the switching voltage V for the wavelength $\lambda_2$, as shown in FIG. 2C, the phase shift vector falls short of returning to point 0 by an even greater phase angle of $\epsilon_2+\delta$, because of the longer wavelength of input light and/or intrinsic dispersion in the LC material. Similar Poincaré sphere diagrams can also be plotted to illustrate the effect of temperature change on the phase shifting performance of a single LC element.

As is observed in the above-described prior art examples, the applied voltage is operable to attempt to reduce the phase shift through the single LC element to zero, which generally corresponds to the OPEN state of a switching device, while no applied voltage provides a $\pi$ phase shift, such that such prior art devices generally operate as normally CLOSED devices. As a result, lack of phase shifting perfection of the element affects the insertion loss of the open switch, and not the attenuation level of the closed state. The disadvantage of this configuration will become apparent in relation to the prior art embodiment of FIGS. 5 and 6 below. In some cases, though, the device design does require such a normally CLOSED device, and this disadvantage cannot then be easily avoided. It should be noted that the convention used throughout this application is that the term CLOSED is used to denote a switch which does not allow passage of light, i.e. at maximum attenuation, while the term OPEN is used to denote a switch which allows maximum passage of light, i.e. at minimum attenuation.

Although the embodiments in the present application are generally described in terms of the need for $2n\pi$ and $m\pi$ phase shifts, there also exist other applications using liquid crystals in which the required phase shift for correct operation of the application is other than $\pi$. Examples of such applications are quarter wave plates, or other special retarder plates. It is to be understood that in these applications also, the efficiency and stability of operation of the application is dependent on the attainment of the exact required phase shift, which can be problematic for a single LC element, as explained above.

Figure 3:
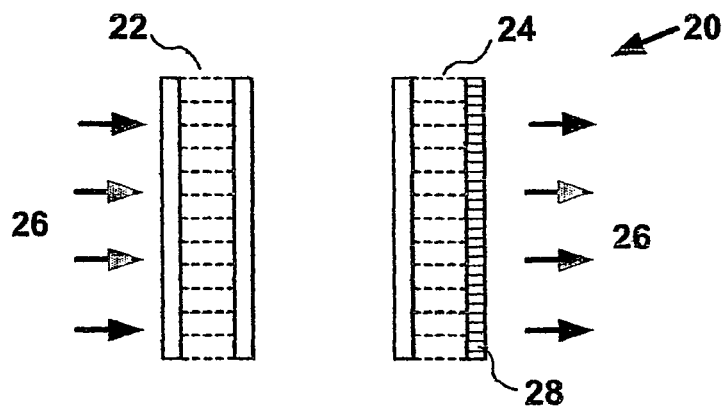
FIG. 3 is a schematic drawing of a liquid crystal device, constructed and operative according to a preferred embodiment of the present invention.

Reference is now made to FIG. 3, which is a schematic drawing of a liquid crystal device, constructed and operative according to a preferred embodiment of the present invention, which overcomes many of the above-described limitations of prior art devices, but without substantially increasing the constructional or functional complexity of the device. The device 20 preferably comprises two liquid crystal cells 22, 24, arranged in series such that the light beam 26 being processed passes through them sequentially. One of the cells is preferably pixelated 28. Each of the individual cells is preferably made up of a pair of transparent cover plates with the liquid crystal material sandwiched between, as described hereinabove. In the preferred embodiment shown, the cells are such that they provide equal and opposite mutual phase shifts to light traversing them respectively. This is preferably achieved by aligning the cells such that there is a 90 degree alignment between the rubbing directions or the preferred directions of orientation of the two cells.

The operation of this preferred embodiment, for one specific wavelength, can be described by reference to FIGS. 4A and 4B, which are equatorial plane cross-sections of a Poincaré sphere diagram showing the state of polarization of light traversing the device, in FIG. 4A for no applied drive voltage and in FIG. 4B for an applied switching drive voltage. In order to simplify the description of the invention, the equatorial plane of the Poincaré diagram is shown, in which the light traversing the device is of linear polarization. It is to be understood, though, that according to different preferred embodiments of the present invention, the device should operate equally for any cross-sectional plane of the sphere, traversing any form of polarization, linear, circular or elliptical. In cases in which the polarization is not linear, the description in phase space is not a great circle moving over the Poincaré sphere to an approximately diametrically opposite point, but another motion path.

Figure 4A:
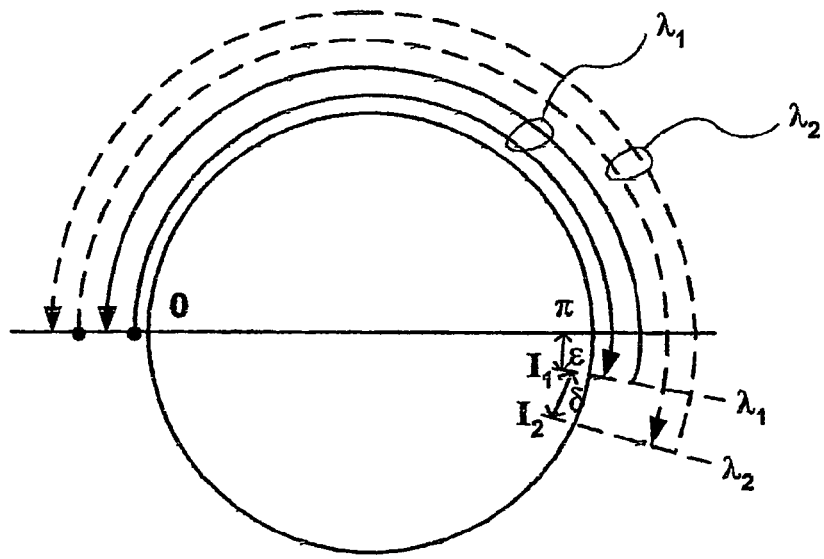
Figure 4B:
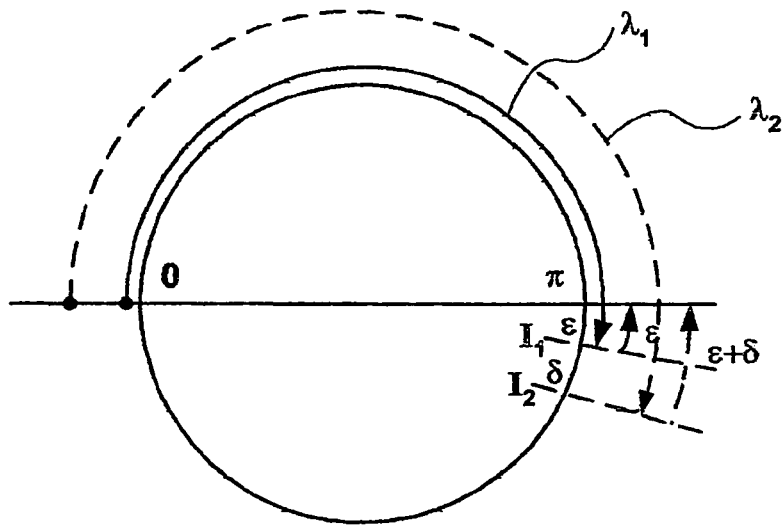

Reference is first made to the full lines circumventing the Poincaré diagrams of FIGS. 4A and 4B, which refer to light of a first wavelength $\lambda_1$. The first liquid crystal cell 22 is preferably of gap construction and material properties such that for the light of wavelength $\lambda_1$ traversing it, the differential phase shift $\phi_1$ from the point 0 to the point $I_1$, as shown in FIG. 4A, is slightly more than $\pi$, and is designated as $(\pi+\epsilon)$. The second cell 24 is of dimensions and material such that the total differential phase shift of the $\lambda_1$ light traversing it without any applied drive voltage is also $(\pi+\epsilon)$, but the direction of the phase change is reversed, as explained above. As a result, the vectorial phase change is $-(\pi+\epsilon)$, thus moving from the point $I_1$ back to its starting point at the point 0. Thus, the total differential phase shift, $\Delta\phi$, of the $\lambda_1$ light traversing both cells is zero. This is the situation shown by the full circumferential lines in FIG. 4A, when no voltage is applied to either cell.

Referring now to FIG. 4B, in passage through the first liquid crystal cell 22, light of wavelength $\lambda_1$ undergoes a differential phase shift of $(\pi+\epsilon)$ to point $I_1$, exactly as in FIG. 4A, since no voltage is applied to the cell 22. The second cell 24, however, is selected to be such that, when an appropriate voltage $V_1$ is now applied to it, the phase change in the $\lambda_1$ light traversing it is arranged to be $-\epsilon$, such that the total phase shift of the $\lambda_1$ light traversing both cells of the device is now exactly $\pi$, as shown in FIG. 4B. Since the required phase change of $-\epsilon$ in the second cell is small, this state is readily achieved by the application of comparative small applied voltages, even in materials where $n_o$ and $n_e$, do not converge until very high voltages, if at all. As a result, there is provided a device, according to this preferred embodiment of the present invention, which can impart to an incident beam a switchable phase change of exactly 0 or $\pi$, by means of low applied voltages, and without the above-mentioned disadvantages of single element prior art devices, as described in FIGS. 2A to 2C.

Reference is now made to the dotted lines circumventing the Poincaré diagrams of FIGS. 4A and 4B, which refer to incident light of a second wavelength $\lambda_2$. Because of the dispersive properties of the LC material, for the case of zero applied voltage to the second cell, as shown in FIG. 4A, and for light of wavelength $\lambda_2$, the differential phase shift through the first element 22 is slightly more, by an angle $\delta$, than that for $\lambda_1$, and is designated as $(\pi+\epsilon+\delta)$, the additional phase shift $\delta$ being a result of the material dispersion. This takes the phase shift vector from the point 0 to the point $I_2$. Passage through the second element 24 results in exactly the same phase shift, but in the reverse direction, such that the phase vector returns to its starting point 0.

Referring now to FIG. 4B, in passage through the first liquid crystal cell 22, light of wavelength $\lambda_2$ undergoes a differential phase shift of $(\pi+\epsilon+\delta)$ to point $I_2$, exactly as in FIG. 4A, since no voltage is applied to the cell 22. When an appropriate voltage $V_2$ is now applied to the second cell 24, the phase change in the $\lambda_2$ light traversing it is now $-(\epsilon+\delta)$, such that the phase vector is returned from the point $I_2$ to the point $\pi$, and the resultant total phase shift of the $\lambda_2$ light traversing the device is now exactly $\pi$, as shown by the dotted lines in FIG. 4B. In general, $V_1$ is not equal to $V_2$, but by predetermined use of the appropriate control voltage for each transmitted wavelength, it becomes possible to compensate for the wavelength dispersive effects of the LC material. Since in practice, each pixel of the pixelated LC element preferably handles a different wavelength of the traversing light, it is a simple procedure to program the drive fields to each different pixel so as to compensate for known dispersion, such that the device becomes essentially dispersion free.

Reference is now made to FIG. 4C, which illustrates schematically a double cell liquid crystal phase shifting device, constructed and operative according to a preferred embodiment of the present invention, illustrating the application of the Poincare sphere representations of FIGS. 4A and 4B in a real device. Expressed in the familiar terms of the rotation of linearly polarized light passing through the device, the cells shown in FIG. 4C are preferably chosen to be such that the rubbing direction of the first cell 22 is aligned to provide a +45° rotation to incident linearly polarized light 27, while the rubbing direction of the second cell 24 has a reversed direction, and rotates incident linearly polarized light by −45°. Such a pair of elements, having identical but geometrically reversed polarization rotation properties, arising from identical but geometrically reversed phase shifting properties, is comparatively simple to provide by cutting from a larger area LC element, having a rubbing direction aligned to provide a 45° polarization rotation, smaller separate cells 22 and 24, and assembling them back to back, such that one provides the desired +45° rotation and the other a −45° rotation. Since the separate cells are cut from a single large LC wafer, and are preferably taken from neighboring areas of that large wafer having essentially identical gap thickness and material properties, the two smaller cells should preferably have essentially identical phase shifting properties, but, because of their reversed installation in the device, of reversed direction. Thus, referring back to FIG. 4A for the situation with no applied voltage, the two identical but reversed direction serially disposed cells 22, 24, provide zero phase shift, while application of the correct switching voltage to one of the cells, shown in FIG. 4B as the second cell, provides the desired $\pi$ phase shift. When used in a device for switching or blocking incident light, FIG. 4A, with no applied voltage, would represent a normally OPEN situation with the light passing essentially unattenuated except for the insertion loss, while FIG. 4B shows the device switched to the CLOSED position by means of an applied voltage on the second cell, so that the incident light is blocked. Since the phase shift is exactly $\pi$ in this state, the blocking attenuation is high. This configuration is thus operationally the opposite of that of the prior art device shown in FIG. 1 and described in FIGS. 2A and 2B, and the advantages of this configuration will be shown hereinbelow with respect to FIGS. 6 and 7.

Table I illustrates the values of the phase shifts in each of the two liquid crystal elements 22, 24, for the above described device, and for the wavelength $\lambda_1$. As is observed, according to these embodiments of the present invention, the problematic situation of prior art devices, namely the need to achieve a zero phase shift in a single cell, is thus obviated.

TABLE I

| Drive voltage V | | $\phi_1$ | $\phi_2$ | $\Delta\phi$ |
|---|---|---|---|---|
| $V_{OPEN}$ | (=0) | $\pi + \epsilon$ | $-(\pi + \epsilon)$ | 0 |
| $V_{CLOSED}$ | (=V) | $\pi + \epsilon$ | $-\epsilon$ | $\pi$ |

According to this described embodiment of the present invention, the device is thus able to achieve differential phase shifts in the light passing through a pixel of exactly 0 and π for the two switched states of that pixel, but without the need to operate any single liquid crystal element at a higher voltage or with a thicker cell gap than that generally required, and with the ability to compensate for wavelength dispersion in the material. This difference between the device of the present invention and prior art single cell devices can be further illustrated by reference back to FIG. 2A showing a graph of the birefringence of the liquid crystal material as a function of applied voltage, and the explanation thereto. With single element prior art devices, a phase shift of n is obtained with zero applied voltage, while a zero phase shift, or as close to zero phase shift as is possible to attain, is achieved by applying the full drive voltage to the single cell. According to the double element devices of the present invention, a phase shift of π is obtained with a comparatively small applied drive voltage, while a true zero phase shift is achieved without any drive voltage applied to the device.

The above description of the operation of the preferred embodiment of the device of the present invention has been described in terms of zero and π phase shifts for the two switched states of the device. Such states would preferably be those desired when the device is used for a transmissive switch application. When the device is used in a reflective switch application, in which a reflective surface is located on the far side of both elements of the device, such that the switched light returns through the device when the switch is in the OPEN state, it is to be understood that the desired phase shifts for the two states would then preferably be zero and π/2, since the light passes twice through both elements of the device, on its forward and return passages.

In the above described preferred embodiment of the present invention, as shown in FIG. 3, the first liquid crystal cell 22 is operative only to compensate for the fact that the second cell 24 cannot get to true zero phase shift. Consequently, there is no need for the first cell 22 to possess any switching properties, and it need not therefore have any pixelated electrode structure. This cell 22 is therefore known as the offset or compensating cell. The other cell 24, operative for spatially processing the light beam passing through the device, has a pixelated electrode structure 28 for this purpose, and is thus known as the processing or switching cell. It is to be understood though, that these functions can be reversed, with the pixelization on the first cell 22, and the second cell 24 as the offset cell, or even with pixels on both, as will be described below in relation to FIGS. 10A to 10C.

If the cells were constructed having truly identically behavior, but reversed phase shifting properties, there would be no need for any active electrode at all on the first cell. In practice, it is generally more convenient to provide the first cell with a single unpixelated electrode, such that this electrode can be used to provide small overall changes to the properties of the first cell to compensate for any lack of identity in the properties of the two cells.

Though the above described embodiment of the present invention has been described with the second cell used as the processing cell and the first as the compensating cell, it is to be understood that the invention would operate equally effectively with these roles reversed.

Reference is now made to FIG. 5, which illustrates an array of pixels 30 on a prior art, single cell, liquid crystal beam polarization modulator, and to FIG. 6, which is a schematic graph of the transmission function at the focal plane of light passing through a device using the array of FIG. 5 as the polarization modulating element. The array is made up of a row of pixels 32, 33, 34, . . . which are defined by pixelated electrodes deposited on the surface of the liquid crystal cell, with spaces between them 35, 36, 37, 38, . . . to separate each pixel from its neighbor. In the example shown in FIG. 6, the spatial arrangement of the pixels is used to spatially process different wavelength components of the light passing through the element, such as would be obtained after traversing a dispersing element in the system. In the preferred application illustrated in FIGS. 5 and 6, the device is a normally CLOSED device, such that if there is no applied field on a specific pixel, such as 34, the phase shift therein results in rotation of the polarization passing through pixel 34 so as to result in blocking of the transmission for that pixel. As shown in FIG. 6, the transmission for the channel 40 passing through pixel 34 thus drops to the closed value for the device. For those pixels where the activation field is applied, so as to provide close-to-zero phase shift, and to leave the polarization virtually unchanged, the transmission level remains at its maximum attainable level, attenuated only by the insertion loss. However, at positions between the pixels, 35, 36, 37, . . . where, because of the edge effects between pixels, the field falls below the value required to provide close to zero phase shift and hence full transmission, at the interface between each pair of "open" pixels, there is a local spatial drop 42 in the transmission level. Such transmission "blips" are undesired in most optical transmission applications.

Use in the multiple cell transmission device, of double elements, according to the above-described embodiments of the present invention, enables these transmission "blips" to be eliminated, resulting in a transmission plot as shown in FIG. 7. This is apparent by referring back to FIGS. 4A to 4C, from which it is observed that such a device, constructed according to a further embodiment of the present invention, is a normally OPEN device with no applied voltage, and that application of the control voltage is required in order to close the device and hence to block a channel such as channel 40. Consequently, the transparent mode OPEN channels, such as those of pixels 32, 33 in the pattern of FIG. 5, transmit when no voltage is applied, and thus should be free of the transmission "blip" effects arising from the fringe fields of the prior art device of FIG. 5.

In the above described preferred embodiments of the present invention, the liquid crystal cells used are birefringent nematic elements, each of which is aligned symmetrically with their rubbing angles at ±45° respectively to the incident linearly polarized light, as shown above in FIG. 4C. According to further preferred embodiments of the present invention, the liquid crystal materials can also be of twisted nematic structure, with the two elements having their twist angles in opposite directions and their rubbing angles mutually aligned by 90°, or one element can have a nematic material and the other a twisted nematic material, with the appropriate alignment between them, or they can be of any other type which operate to generate symmetrically and oppositely directed differential phase shifts to a traversing light beam. Furthermore, according to other preferred embodiments of the present invention, the cells can have different thicknesses, different pixel patterns, different wavelength dispersive properties, different chirality or different temperature dependencies of their optical activity. Some of these embodiments are now illustrated in FIGS. 8 to 10D.

Reference is now made to FIG. 8, which is a schematic illustration of a device according to another preferred embodiment of the present invention, in which the liquid crystal cells have different material thicknesses, $d_1$, and $d_2$. The use of such a combination enables compensation to be made for anomalies or differences in the properties of the liquid crystal materials. Thus for instance, in the case of uncompensated phase shifts in transit through the switched and unswitched cells, as discussed above in relation to FIGS. 4A and 4B, it becomes possible to select the cell thicknesses $d_1$, and $d_2$ to compensate for any shortfall in phase shift by means of an additional optical path length in one of the cells. Likewise, the different thicknesses may be used to enable the simple achievement of phase shifts other than $\pi$, for use in specially designed retarder plates.

In cases of cells of the types described in the embodiments of FIGS. 4A and 4B, but having different cell gaps, the general relationship to be used between the cell gaps d, and the values of $\Delta n$, is given by:

$$\Delta n_1 d_1 = \Delta n_2 d_2 \qquad (2)$$

where the suffixes refer to cells 1 and 2 respectively. In the above described embodiments, when the materials of the two cells is the same, and $\Delta n_1 = \Delta n_2$, then the criterion in equation (2) requires that $d_1 = d_2$. If however the materials of the two cells are different, then the values of $d_1$ and $d_2$ are also different accordingly.

Reference is now made to FIG. 9A, which is a schematic graph illustrating an example of a plot of the effect of temperature on the value of $n_e$ for a typical liquid crystal material. The graph shows that the value of $n_e$ falls with increasing temperature. $n_e$ is here taken as being typical of either of the refractive indices of the LC material, $n_e$ or $n_o$. As a result of this dependence, a device constructed using elements containing this material will be sensitive to changes in ambient temperature. FIG. 9B now shows a graph of a second liquid crystal material, in which the functional dependence of $n_e$ with temperature is exactly opposite to that shown by the material of FIG. 9A. If now, in the double LC element device of FIG. 3, one of the elements were to be constructed using the material of FIG. 9A and the other the material of FIG. 9B, the resulting device, according to this further preferred embodiment of the present invention, would show negligible temperature dependence, depending on how well the temperature dependencies of $n_e$ of the two materials could be oppositely matched. Though the temperature dependencies are shown in FIGS. 9A and 9B as being linear, it is to be understood that the method is operative also for other functional dependencies, on condition that the dependencies of the two materials as a function of temperature are complemented.

In a similar manner to that shown in FIGS. 9A and 9B for compensating for temperature dependence by means of two oppositely matched materials, according to another preferred embodiment of the present invention, it is possible to compensate for wavelength dispersion by selecting two materials with oppositely matched plots of $n_e$ as a function of wavelength, as shown by the alternative abscissa notation in FIGS. 9A and 9B.

Reference is now made to FIG. 9C, which is a schematic representation of the manner in which the serial use of two liquid crystal cells is able to compensate for changes in the birefringence of the liquid crystal material, and hence of the phase change generated in passage through the cells, as a function of the effect of changes in ambient temperature or of the wavelength of the transmitted light. In FIG. 9C, the curve 44 represents schematically the effects of either birefringence or phase change in one cell of the device as a function of either wavelength or temperature respectively, while curve 46 represents these same effects as a function of either wavelength or temperature for the second cell. As is observed in FIG. 9C, use of two cells having materials with changing characteristics of opposite sign is able to compensate for the effect of change in the characteristic of the material concerned in each individual cell, and the net effect is of a device having those characteristics with an effectively zero level. This representation thus summarizes schematically, the resulting operative effect of some of the previously described embodiments of the present invention.

Figure 10A:
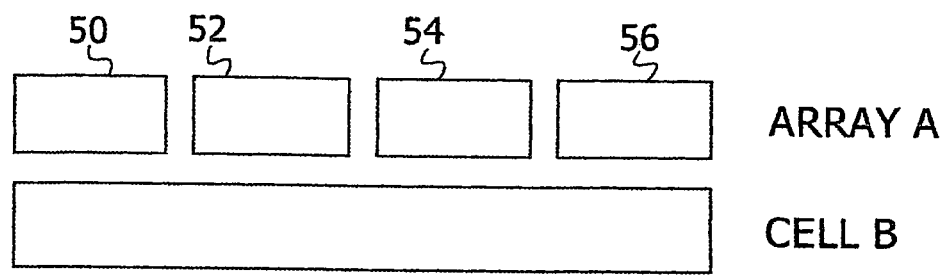
FIGS. 10A-D show the pixel arrangement on two elements of a double LC device such as that shown in FIG. 3, according to other preferred embodiments of the present invention, in which the spatial arrangement of pixels in the two elements are different.

Reference is now made to FIGS. 10A to 10D, which show different preferred arrangements of pixel dimensions and positions, on the two elements of a double LC device such as that shown in FIG. 3, according to more preferred embodiments of the present invention. FIG. 10A illustrates a pixelated array of double cell construction, according to a preferred embodiment of the present invention, in which one of the cells has a pixelated array structure, 50, 52, 54, 56, and the other cell is unpixelated, denoted as cell B, and acts as the offset cell, as described for a single element in FIG. 3.

Figure 10B:
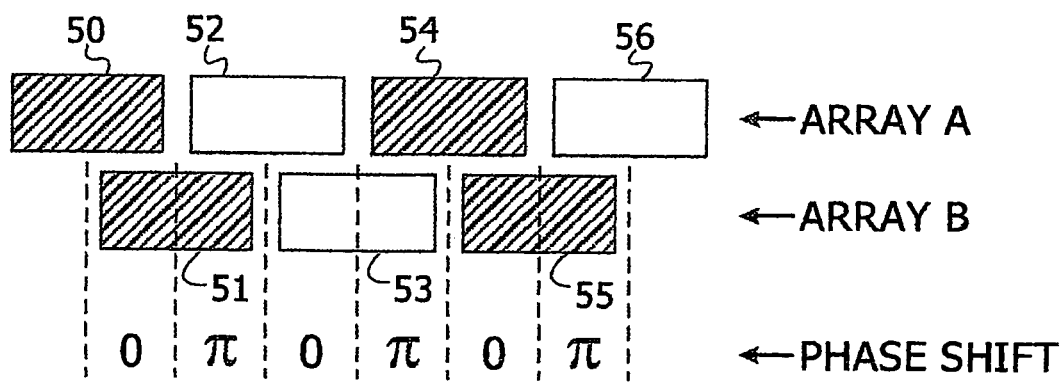
Figure 10C:
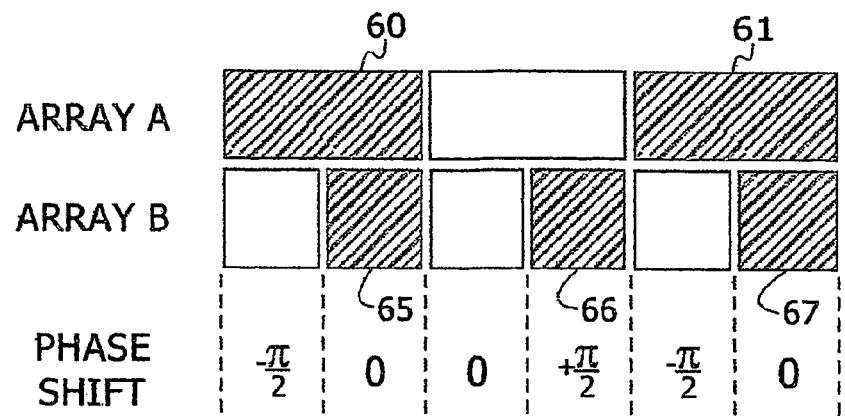
Figure 10D:
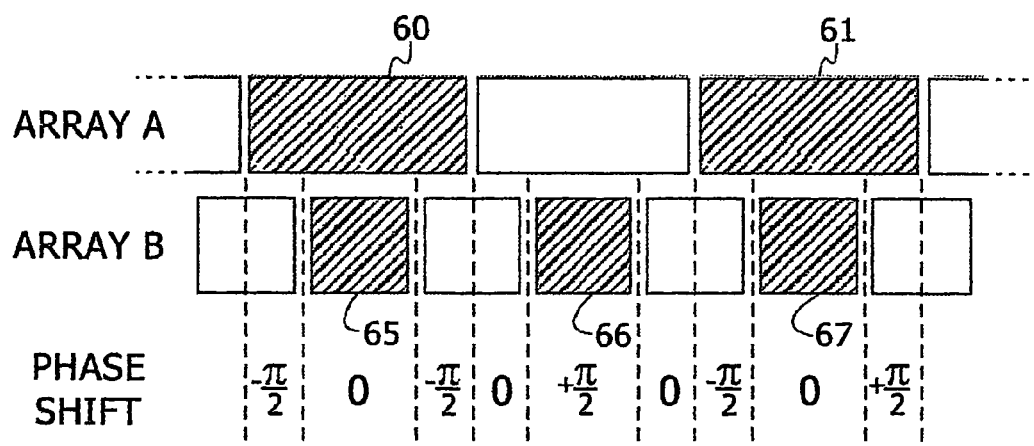

However, by pixelating both of the elements of the device, and activating pixels in both of the elements, increased flexibility is achievable in terms of spatial channel resolution and patterning. Such preferred embodiments are shown in FIGS. 10B to 10D. Activation of the pixels in these drawings is schematically shown by shading.

In FIG. 10B there is shown a first row nominally described as the top row because of its position in the drawing, having a pixel pattern 50, 52, 54, 56 . . . on one element of the double element device, while what is termed the bottom row, has a pixel pattern 51, 53, 55, . . . on the other element. The pixels are of identical size. However, the pixel patterns of the top and bottom rows of elements are offset laterally by half a pixel width. In this manner, if the top array is activated with drive voltages such as to provide a phase shift of $\pi$, and the bottom array is not activated, the usual operation previously described in the embodiment of FIG. 3 is obtained. If on the other hand, the bottom array is activated, and the top array not, the usual operation as previously described is again obtained, but offset along the wavelength axis by one half pixel width. Thus, by alternating between these two options, a device with shiftable channels is obtained.

Alternatively and preferably, if both arrays are activated simultaneously, such as is shown by the shaded pixels in both rows in FIG. 10B, the spatial resolution of the device can be made twice as high as that of the equivalent device of FIG. 10A having only one array of pixels. Thus, for instance, when alternate pixels 50 and 54 of the first array are activated with the appropriate drive voltages, and alternate pixels 51 and 55 of the second array, an array of alternate zero and $\pi$ phase changes can be obtained, as shown in the phase shift designation beneath the bottom array, but with a spacing equal to only half that of one pixel.

In use, it is thus seen possible to activate combinations of the first and second element pixels to obtain spatial patterns having a resolution which would be impossible to obtain with a single LC element device, enabling for instance, denser spaced switching or blocking of wavelength channels, together with all of the previously mentioned advantages of a double celled device. Alternatively and preferably, the phase shift generated can have a specially shaped spatial profile imparted to it by use of activation of two separate and different pixel sets on the two elements.

Furthermore, it is to be understood that generation of a phase shift of π by activation of a pixel in either of the rows, is only an example of the typical use of the array in a switching or blocking device, where phase shifts of zero and π generally define the two possible open and closed states of a transmission-based switch. However, other phase shifts can also be used, such as would produce different levels of attenuation in the pairs of pixels in each transmission path, such that these embodiments could be preferably used for other applications, such as in channel equalization or leveling applications. In addition, it is possible to produce different phase shifts in different pixels in either row, such that complex and numerous different attenuation profiles can be obtained, according to the programming of the activation of the different pixels.

Reference is now made to FIGS. 10C and 10D, which schematically illustrate more preferred pixel pattern arrangements of the double cell device of the present invention, enabling even more flexibility than that shown in FIG. 10B. In FIGS. 10C and 10D, the pixels on one of the cells, as indicated by the bottom row, are only half the width of those on the other cell. In the embodiment shown in FIG. 10C, each pair of pixels in the bottom row are aligned exactly collinearly with each single pixel of the top row. In the embodiment shown in FIG. 10D, the pairs of pixels in the bottom row are offset by one half bottom-row pixel width, such that the center of the bottom row pixels fall alternately at the center of the top row pixels, and exactly between two top row pixels.

In either of these two embodiments, in their simplest configurations, the channel spacing can be selected by suitable activation of the relevant cells. Thus, activation of the bottom row only, could provide channel spacing of only half that obtained by activation of the top row only. In either case, the inactivated element may act as compensating element.

In FIGS. 10C and 10D, preferred embodiments are shown with alternate pixels activated in both rows, in the examples shown, pixels 60 and 61 in the top row, and pixels 65, 66 and 67 in the bottom row. Beneath each double cell, the resulting overall phase shift generated by the chosen activated combination is stated, to illustrate the possible combinations achievable with such embodiments. A single pixel phase shift of π/2 is shown in these embodiments, though it is to be understood that other phase shifts could equally well be chosen. Furthermore, in the embodiment of FIG. 10D, some of the channels, namely, those on either side of the edges of the pixels in the top row, can optionally be provided with channel spacings only half those of the channel spacings of the bottom row pixels. Additionally, the center wavelengths of the channels can preferably be shifted thereby. However, it is to be understood that the arrangements of activated pixels shown are only examples of what can be achieved with these pixel geometries, and that other activation arrangements are also possible.

The above-described embodiments in FIGS. 10B to 10D are only three examples of preferred embodiments using pixel geometry and positioning to achieve greater device performance or flexibility than that provided by the usual embodiment of FIG. 10A. It is to be understood that this aspect of the present invention is not meant to be limited to the three preferred embodiments shown, but that the scope of present invention in this respect is meant to cover the use of multiple pixel geometry and mutual spacing in general. Furthermore, a ratio between pixel geometries even greater than those shown in FIGS. 10C and 10D can also be envisaged, such as a row of pixels one third the size of the other row.

The above-described embodiments have been described in terms of only two liquid crystal elements, selected such that the total additive phase shift through them is adjusted to be switchable exactly to the desired phase shift between the two states. Though the use of two elements is generally the simplest and most cost-effective method of so doing, it is to be understood that the present invention is not meant to be limited to the use of two elements, but is also operable with three or even more elements.

It will be appreciated by persons skilled in the art that the present invention is not limited by what has been particularly shown and described hereinabove. Rather the scope of the present invention includes both combinations and sub combinations of various features described hereinabove as well as variations and modifications thereto which would occur to a person of skill in the art upon reading the above description and which are not in the prior art.

The invention claimed is:

1. An optical processing device comprising:

a first birefringent element imparting a first phase shift to light passing therethough, the birefringence of said element having a functional variation with temperature; and at least a second birefringent element disposed serially to said first element such that said light traverses both elements, said second birefringent element imparting a second phase shift to said light;

wherein the birefringence of said second element has a functional variation with temperature different from that of said first element, and wherein said elements are mutually aligned such that the functional variation of the birefringence of said optical processing device is reduced in comparison with the functional variation of said birefringence of either one of said elements alone, and wherein one of said birefringent elements is pixilated, at least one of said pixels being activated by means of an applied control signal to impart a controllable phase shift to light traversing said at least one pixel.

2. An optical processing device according to claim 1 and wherein the birefringent properties of said pixilated birefringent element are wavelength dependent, and wherein said control signal applied to said at least one pixel is adjustable according to the wavelength of the light traversing said at least one pixel, such that said device is essentially wavelength independent.

3. An optical processing device according to claim 2 and wherein said device is operated as an optical switch element.

4. An optical processing device comprising:

a first birefringent element imparting a first phase shift to light passing therethough, the birefringence of said element having a functional variation with temperature; and at least a second birefringent element disposed serially to said first element such that said light traverses both elements, said second birefringent element imparting a second phase shift to said light;

wherein the birefringence of said second element has a functional variation with temperature different from that of said first element, and wherein said elements are mutually aligned such that the functional variation of the birefringence of said optical processing device is reduced in comparison with the functional variation of said birefringence of either one of said elements alone, and wherein at least one of said first and said at least second birefringent elements is a liquid crystal element.

5. An optical processing device comprising:
a first birefringent element imparting a first phase shift to light passing therethough, the birefringence of said element having a functional variation with temperature; and
at least a second birefringent element disposed serially to said first element such that said light traverses both elements, said second birefringent element imparting a second phase shift to said light;
wherein the birefringence of said second element has a functional variation with temperature different from that of said first element, and wherein said elements are mutually aligned such that the functional variation of the birefringence of said optical processing device is reduced in comparison with the functional variation of said birefringence of either one of said elements alone, and wherein said liquid crystal cell is pixilated, at least one of said pixels being activated by means of an applied control signal to impart a controllable phase shift to light traversing said at least one pixel.

6. An optical processing device according to claim 5 and wherein the birefringent properties of said pixilated liquid crystal element are wavelength dependent, and wherein said control signal applied to said at least one pixel is adjustable according to the wavelength of the light traversing said at least one pixel, such that said device is essentially wavelength independent.

7. An optical processing device according to claim 5 and wherein said device is operated as an optical switch element.

* * * * *